United States Patent [19]

Deschamps et al.

[11] 4,310,497

[45] Jan. 12, 1982

[54] PROCESS FOR PURIFYING A HYDROGEN SULFIDE CONTAINING GAS

[75] Inventors: André Deschamps, Noisy le Roi; Claude Dezael, Maisons Laffitte; Sigismond Franckowiak, Rueil Malmaison; Henri Gruhier, Chatillon/Bagneux, all of France

[73] Assignee: Institut Francais du Petrole, Rueil-Malmaison, France

[21] Appl. No.: 230,174

[22] Filed: Jan. 30, 1981

Related U.S. Application Data

[63] Continuation-in-part of Ser. No. 149,815, May 15, 1980, abandoned.

[30] Foreign Application Priority Data

May 15, 1979 [FR] France ............................. 79 12542

[51] Int. Cl.³ ............................................. B01D 53/36
[52] U.S. Cl. .................................. 423/230; 423/231; 423/539; 423/573 G; 423/574 R; 252/411 S; 252/416; 252/419
[58] Field of Search ............... 423/224, 230, 231, 539, 423/542, 573 G, 574 R; 252/411 S, 416, 419

[56] References Cited

U.S. PATENT DOCUMENTS

| | | | |
|---|---|---|---|
| 3,284,158 | 11/1966 | Johswich | 423/539 X |
| 4,008,174 | 2/1977 | Jacobsen et al. | 252/411 S |
| 4,044,114 | 8/1977 | Dezael | 423/574 R |
| 4,088,736 | 5/1978 | Courty et al. | 423/574 R |
| 4,251,495 | 2/1981 | Deschamps et al. | 423/230 |

FOREIGN PATENT DOCUMENTS

| | | | |
|---|---|---|---|
| 154456 | 12/1953 | Australia | 423/230 |
| 5070 | of 1883 | United Kingdom | 423/573 |
| 498734 | 1/1939 | United Kingdom | 423/231 |

*Primary Examiner*—Earl C. Thomas
*Attorney, Agent, or Firm*—Millen & White

[57] ABSTRACT

A process for purifying a gas containing hydrogen sulfide, wherein said gas is admixed with oxygen and contacted with a carbon mass of specific surface higher than 50 m2/g and containing at least one oxide and/or sulfate of iron and/or copper, at a temperature from 20° to 170° C., the operating conditions being so selected as to avoid a substantial oxidation of said mass and said mass being periodically regenerated by heating to 200°–300° C. in the presence of oxygen, the regenerating conditions being such as to avoid a substantial oxidation of the carbon mass.

10 Claims, No Drawings

PROCESS FOR PURIFYING A HYDROGEN SULFIDE CONTAINING GAS

This application is a continuation-in-part of our application Ser. No. 149,815 filed May 15, 1980, and now abandoned.

This invention concerns a catalytic process for purifying a gas containing hydrogen sulfide.

This process can be used for purifying industrial gases containing small amounts of hydrogen sulfide, which compound is malodorous and very toxic, so that its discharge to atmosphere is subjected to very strict regulations.

These gases must be incinerated before being discharged, so as to convert $H_2S$ to $SO_2$, which is a less toxic compound.

This incineration may be performed either thermally or catalytically. The advantage of the catalytic method is to start the oxidation of $H_2S$ at a lower temperature than by the thermal method and, consequently, to reduce the power consumption required to preheat the gases. The applicant has already described in the U.S. Pat. Nos. 4,044,114 and 4,088,736, catalysts which can be used to perform said oxidation at temperatures from 250° to 350° C. instead of 450° to 600° as used in the thermal process.

A process has now been discovered, whereby the oxidation of $H_2S$ to $SO_2$ can be achieved with a still lower power consumption than according to the catalytic method already proposed.

According to this process, the hydrogen sulfide containing gas, with added oxygen, is contacted with a carbon mass having a surface of at least 50 m$^2$/g, containing at least one oxide and/or sulfate selected from the oxides and sulfates of iron and copper, at a temperature from 20° to 170° C., preferably 70° to 140° C.

Hydrogen sulfide is retained by the carbon mass mainly as sulfur. A portion of hydrogen sulfide may also be converted to a sulfide of the catalytic metal.

The catalyst mass may be periodically regenerated by passing therethrough an oxygen containing gas at 200°-300° C., preferably 220°-260° C.; however, since the gas subjected to the $H_2S$ absorption step simultaneously contained hydrogen sulfide and oxygen, the process can be operated without regeneration over longer periods than the same process operated without oxygen in the $H_2S$ absorption step.

The catalysts which can be used according to the process of the invention consist of one or more oxides and/or sulfates of copper and/or iron, deposited on an active carbon carrier of large surface.

Active carbon of large surface is intended to mean carbon having a specific surface of at least 50 m$^2$/g, preferably from 100 to 1250 m$^2$/g, and a porosity of at least 0.2 cc/g. This carbon has a double effect: It permits to disperse the active metal compound(s) over a great surface, thus increasing their reactivity with respect to $H_2S$, and it further permits to collect and store a substantial amount of sulfur within its pores before requiring a regeneration.

The Cu and Fe metal compounds which are involved in the different phases of use of the catalyst are oxides, sulfides and sulfates. The corresponding metals may be introduced onto the active carbon carrier by known methods, particularly by impregnating the latter with solutions of such salts as nitrates, formates, acetates, oxalates or chromates. After drying, the salts are decomposed by heating. During this heating, the operating conditions are such as to avoid any substantial oxidation of the carbon. It may thus be advisable to proceed in neutral or oxidizing atmosphere at relatively low temperatures, of about 250° C. or less; at higher temperature it is preferable to proceed in neutral atmosphere. When desired, a stream of gas containing at first $H_2S$, then oxygen, may be used to convert subsequently at least a portion of the oxides to sulfates.

It is however possible to make use of an oxide at the beginning of the operation. The latter, in the presence of oxygen, will, more or less completely, be converted to a sulfate during the operation itself or during the regeneration, so that, in the course of subsequent cycles, the catalyst will operate to a large extent as a sulfate. A preferred method consists however of impregnating the carbon with a solution of one or more metal sulfates. In this case, the catalyst may be used, after drying, without previous decomposition. The metal content may vary within a wide range, for example from 1 to 30% by weight and will be preferably from 3 to 15% by weight.

Although the reactions involving these metal compounds are not completely known, it is assumed that, during the phase of treatment of the $H_2S$ containing gas, the following reactions take place (M is copper and/or iron, assumed to be divalent for simplicity):

(1) $4H_2S + 3MSO_4 \rightarrow 3MS + 4SO_2 + 4H_2O$ (2) $H_2S + MO \rightarrow MS + H_2O$ (3) $2H_2S + SO_2 \rightarrow 3S + 2H_2O$ $SO_2$ produced by the reaction (1) reacts with $H_2S$ to produce sulfur which remains adsorbed in the carbon pores, so that the proportion of $SO_2$ in the effluent gas is small. Since the gas contains oxygen, a portion of the $H_2S$ may be directly oxidized essentially to sulfur:

(4) $H_2S + \frac{1}{2}O_2 \rightarrow S + H_2O$ and or (5) $H_2S + 3/2\ O_2 \rightarrow SO_2 + H_2O$ $SO_2$ reacts with $H_2S$, as shown above.

When regenerating the catalyst, the following oxidation reactions of sulfur and metal sulfides occur:

(6) $S + O_2 \rightarrow SO_2$ (7) $MS + 3/2\ O_2 \rightarrow MO + SO_2$ (8) $MS + 2O_2 \rightarrow MSO_4$ The process of the invention is applicable to the removal of $H_2S$ from gases containing the same, before discharging them to the atmosphere. The $H_2S$ content of these gases may vary in a wide range, but the process is more particularly useful when applied to dilute gases whose $H_2S$ content is, for example, from 0.001% by volume to 2% by volume and, preferably, from 0.01 to 1% by volume. The gas may also contain other sulfur compounds such, for example, as $SO_2$, without inconvenience.

The gas subjected to the treatment may even consist of air polluted with $H_2S$ as, for example, that issued from the ventilation units of plants where $H_2S$ evolves. The process may also be used for the treatment of waste gas from sulfur producing plants of the Claus type.

As shown above, the present process is operated under relatively mild conditions, so that a substantial oxidation of the carbon mass is avoided.

In the present process, the molar ratio of $H_2S$ to oxygen is at least 0.5:1, preferably at least 1.5:1. An oxygen proportion higher than 25% by volume of the gas to be purified is however to be avoided.

When the catalyst mass has been used for a certain time, $H_2S$ is no longer retained and it is necessary to regenerate the mass. For this purpose, the mass is heated at a temperature from 200° to 300° C. preferably from 220° to 260° C., in the presence of an oxygen-containing gas, for oxidizing the sulfur and the metal sulfides (reactions 6, 7, 8). During this phase, it must be taken care to avoid oxidation of carbon which becomes substantial when the temperature exceeds 260° C. and the oxygen amount is not controlled strictly.

The temperature control within the above range is generally achieved by simultaneously acting on the preheating of the gas introduced on the mass and on its oxygen content (air addition). The preheating temperature is preferably from 180° to 250° C., and the oxygen content from 0.1 to 5% by volume. The treatment is continued preferably up to complete oxidation of sulfur and metal sulfides. It may be followed in a simple manner by controlling oxygen at the inlet and at the outlet.

When no more oxygen is consumed, the catalyst mass is cooled down and re-used for absorbing $H_2S$.

The dilution of the air used for regeneration, in order to adjust the oxygen content to the desired value, may be performed by means of the $H_2S$ containing gas itself. In this case, the gas effluent containing dilute $SO_2$ is generally discharged to the atmosphere.

In the case of treatment of a Claus unit flue gas, it is also possible to recycle the regeneration effluent containing $SO_2$ to the Claus unit. It is then advantageous to obtain a regeneration effluent of high $SO_2$ content by diluting the air with a portion of the regeneration gas. This operating manner thus permits, not only to avoid any $H_2S$ discharge but also to substantially decrease the $SO_2$ evolution to the atmosphere.

The following non limitative examples illustrate specific embodiments of the invention.

EXAMPLE 1

50 cc (20 g) of granular active carbon having a specific surface of 1200 m$^2$/g and a pore volume of 1 cc/g are impregnated with a solution of 18.5 g of $CuSO_4$, $5H_2O$ in 25 cc of water. After draining and drying in a drying oven at 120° C., the weight of the carbon sample is 27.9 g, which corresponds to a $CuSO_4$ content of 28.3% by weight.

The so-prepared carbon sample is placed in a tubular glass reactor of a 2.5 cm diameter, electrically heated. At the bottom of this reactor, there is introduced 100 l/h of a gas containing 500 ppm by volume of $H_2S$, 6% of water vapor, 2% of oxygen, the remainder being nitrogen. The temperature is adjusted to 100° C.

During 96 hours, sulfur accumulates in the carbon mass, no trace of $H_2S$ is detected in the output gas ($H_2S \leq 1$ ppm) and the $SO_2$ content varies in the range from 15 to 30 ppm. Between the 96th and the 100th hour, the $H_2S$ content at the output increases from less than 1 ppm to 20 ppm.

The carbon temperature is then maintained at 250° C. for 8 hours while circulating the same gas at the same flow rate. The $SO_2$ content of the effluent gas increases up to about 2% and then progressively decreases substantially to zero after 8 hours.

The carbon temperature is then brought back to 100° C. without discontinuing the gas flow.

10 cycles have thus been performed (oxidation at 100° C. for 100 hours + oxidation at 250° C. for 8 hours) without any change being observed in the carbon behavior. Particularly, the operation time at 100° C., without $H_2S$ leak, was still from 90 to 100 hours.

EXAMPLE 2

50 cc of the same active carbon as in example 1 (specific surface of 1200 m$^2$/g) are impregnated with a solution of 26 g of $Fe(NO_3)_3$, $6 H_2O$ in 25 cc of water. After drying in a drying oven, the sample is roasted for 2 hours at 400° C. in a nitrogen stream.

The resultant contact mass is then placed in a reactor identical to that of example 1, wherethrough are circulated 100 l/h of air containing 1000 ppm of $H_2S$. The temperature is maintained at 80° C.

During a first operating cycle, it is observed that the effluent practically contains neither $H_2S$ nor $SO_2$, while sulfur accumulates in the contact mass.

After 62 hours, $H_2S$ traces are detected. The $H_2S$ containing air flow is then discontinued and replaced by a stream of 100 l/h of nitrogen containing 2% of oxygen. The temperature is maintained at 250° C. for 8 hours.

After cooling down to 80° C., the carbon is re-used for a new treatment of $H_2S$ containing air.

It is observed that the effluent gas only contains 10 to 20 ppm by volume of $SO_2$ and no $H_2S$ during 62 hours.

12 cycles have thus been performed (oxidation of $H_2S$ at 80° C. followed with regeneration at 250° C.). The operation time at 80° C., without $H_2S$ leak, was still maintained higher than 50 hours.

EXAMPLE 3

A sample of 50 cc of the same contact mass as prepared according to the method described in example 2, is contacted at 120° C. with 100 l/h of a gas containing by volume 2500 ppm of $H_2S$, 500 ppm of $SO_2$, 2% of oxygen and 30% of water vapor, the remainder being nitrogen.

The effluent gas contains 40 to 80 ppm of $SO_2$ and the presence of $H_2S$ is only detected after 15 hours of run. The contact mass is then regenerated by circulating, for 8 hours, at 250° C., 100 l/h of a gas containing by volume 18% of $SO_2$, 2% of oxygen, the remainder being nitrogen.

30 cycles have thus been performed (treatment of the sulfur containing gas at 120° C. for 15 hours followed with regeneration at 250° C. for 8 hours). The operating time at 120° C., without $H_2S$ leak, was still maintained higher than 13 hours and the $SO_2$ content of the gas was maintained between 40 and 90 ppm.

COMPARISON EXAMPLE

Example 1 is repeated, except that the gas (100 l/h) contains no oxygen. It thus comprises 500 ppm (by volume) of $H_2S$ and 6% of water vapor, the remainder being nitrogen. The effluent gas comprises 50 to 100 ppm of $SO_2$, as an average, and $H_2S$ appears in the effluent gas at the 15th hour of run, which is well shorter, as compared with Example 1.

What is claimed is:

1. A process for purifying a gas containing hydrogen sulfide, comprising the steps of:

(a) passing a mixture of said gas with oxygen in contact with the regenerated contact mass of step (b) at a temperature of 20° to 170° C., said contact mass comprising carbon and a metal compound selected from an iron oxide, a copper oxide, an iron sulfate and a copper sulfate and having a specific surface of at least 50 m2/g, the molar ratio of oxygen to hydrogen sulfide being at least 0.5:1, thereby converting hydrogen sulfide essentially to sulfur which remains in the contact mass, (b) periodically passing an oxygen-containing gas through said contact mass at a temperature from 200° to 300° C. and recovering an effluent gas containing sulfur dioxide, thereby regenerating said contact mass for subsequent use in the above step (a).

2. A process according to claim 1, wherein the temperature of step (a) is 70°-140° C.

3. A process according to claim 1, wherein, in step (a), the molar ratio of oxygen to hydrogen sulfide is at least 1.5:1 and the maximum oxygen proportion in the gas is 25% by volume.

4. A process according to claim 1, wherein the gas containing hydrogen sulfide also contains sulfur dioxide.

5. A process according to claim 1, wherein the carbon has a specific surface from 100 to 1250 m2/g.

6. A process according to claim 1, wherein the metal compound content of the contact mass, expressed as metal, is from 10 to 30% by weight.

7. A process according to claim 1, wherein the gas of step (b) contains from 0.1 to 5% by volume of oxygen.

8. A process according to claim 1, wherein the temperature of step (b) is 220°-260° C.

9. A process according to claim 1, wherein the metal compound of step (a) is iron sulfate.

10. A process according to claim 1, wherein the metal compound of step (a) is copper sulfate.

* * * * *